Nov. 19, 1929.   F. C. GIBSON   1,736,260
FORM COLLATING MEANS
Filed April 12, 1926
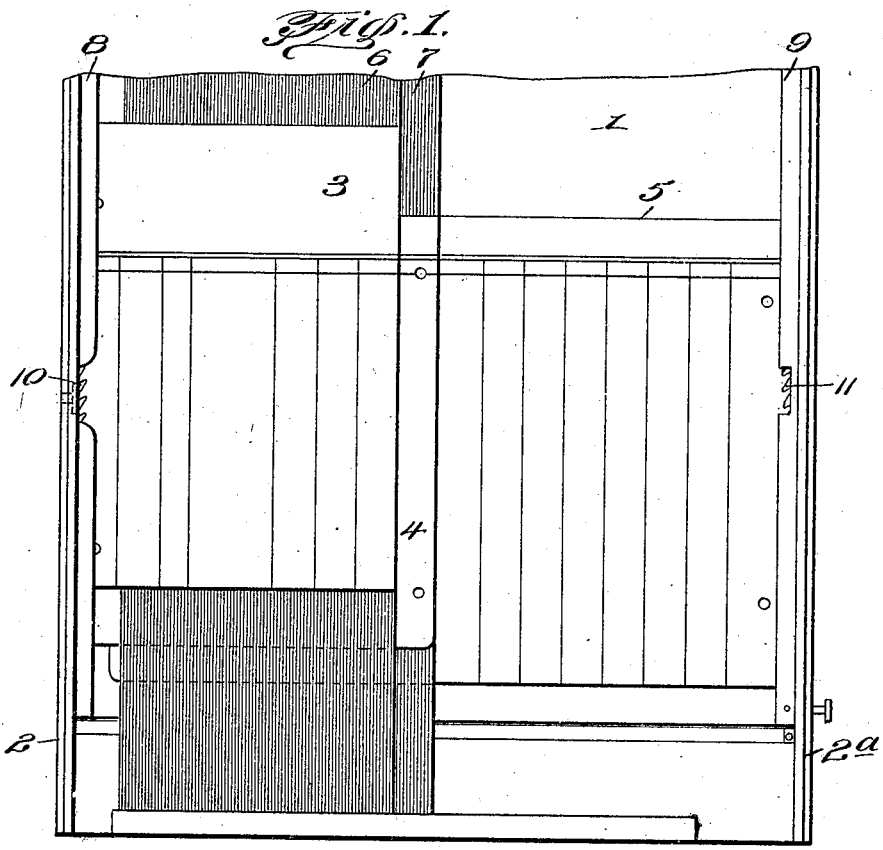
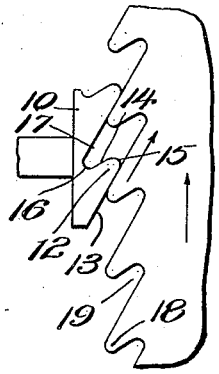 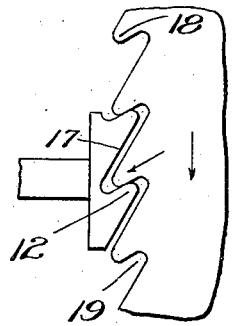 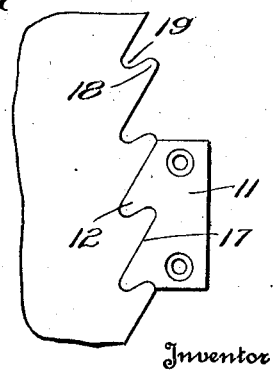
Inventor
Franklin C. Gibson.
By L. G. Julihn
Attorney Patented Nov. 19, 1929

1,736,260

UNITED STATES PATENT OFFICE

FRANKLIN C. GIBSON, OF FAIRFAX COUNTY, VIRGINIA, ASSIGNOR TO ELLIOTT-FISHER COMPANY, A CORPORATION OF DELAWARE

FORM-COLLATING MEANS

Application filed April 12, 1926. Serial No. 101,596.

This invention relates to form collating means and its object is to provide means whereby a plurality of forms or work-sheets may be quickly collated on a flat platen or other surface.

In the drawings:

Figure 1 is a plan view of a portion of the platen of an Elliott-Fisher billing machine illustrating one application of my invention.

Figure 2 is a detailed view showing the manner in which the form and locator are related as the form is being moved from one line position to another.

Figure 3 is a similar view with the form moving to its located position.

Figure 4 is a detailed view showing another form fully located at the opposite side of the platen.

The Elliott-Fisher bookkeeping machine of commerce, a fragment only of which is shown, includes a platen (1) mounted on a platen frame, the side rails (2) and (2ª) of which constitute tracks or guides for the traveling printing mechanism and also serve as alinement guides for the forms or work-sheets (3), (4) and (5), which in the arrangement shown are a statement sheet, a ledger sheet and a proof sheet.

This grouping of forms is only one of many forms of sheet collation utilized in these machines and capable of collation in accordance with my invention. Associated with the forms are strips (6) and (7) of carbon or other transfer material which in this instance are disposed longitudinally of the platen.

The forms are retained by clamps (8) and (9) extending inwardly from the guides (2) and (2ª) and over the edges of certain forms. The platen is depressible to release the forms from the clamp and to permit their removal, replacement or adjustment after which the platen is raised to again clamp the forms.

Obviously, as the traveling printing mechanism prints along predetermined line locations, the work-sheets must be accurately collated, both with reference to each other, and to the line locations of the machine. It is the object of this invention to facilitate such collation.

Extending inwardly from the opposite guides (2) and (2ª) are locators (10) and (11), each having a plurality of locating teeth (12) extending at an angle to the guide and defined by a straight guide face (13) and a locking face (14). The end (15) of the teeth (12) and the bottoms (16) of the interdental spaces (17) being curved as shown. These locators are arranged at opposite sides of the platen and are inclined in opposite directions so that the forms located by different locators will move in different directions in seeking their positions of location.

Each form is provided with a locating margin defined by alternating inclined teeth (18) and interdental spaces (19) conforming in size and contour with the teeth and interdental space of the adjacent locator. That is to say, the teeth or projections of the form conform to the space or spaces of the locator and the tooth or teeth of the locator conform to the interdental spaces of the form.

It will be noted by reference to Fig. 2, that, by reason of the angular relation of the straight guiding edges of the form and locator, the form may be readily moved in one direction with reference to the locator, lateral yielding of the form being necessary to permit the projections of the form to pass the teeth of the locator. This movement of the form brings it to approximately the location desired. If now the form is drawn back as shown in Fig. 3, its projections will engage the teeth of the locator and the form will be cammed into its accurately located position. In this position the form is locked and will resist a lateral pull on the form, which, in order to yield laterally must move longitudinally. By reason of this unusual relation the teeth of the locator really constitute hooks, since they necessitate movement of the form in two directions in order to disengage it. Necessarily, the teeth of the cooperating form and locator are oppositely disposed.

It will be noted by reference to Figures 1, 2 and 4, that the teeth of the locators disposed at opposite sides of the writing surface are inclined in opposite directions. This is an important feature of the invention because this reverses the directions in which forms having their locating means at opposite sides of the writing surface are moved in seeking their approximate locations. Therefore, a form thus moved will not tend to dislocate a subjacent form which has already been located at the opposite side of the platen. For instance, the sheet (5) may be moved freely in one direction to its approximate location and is then by slight movement fully located and locked against movement in the opposite direction as well as against lateral movement. If now, a sheet is imposed on the located sheet and shifted along the opposite locator its movement will be in a direction in which the first sheet cannot move and therefore free movement of the second sheet in the act of properly locating it on the platen will not dislocate the sheet with which it is in frictional contact.

Obviously, it is unimportant in what direction the respective locators are disposed. That is a matter of choice according to the particular direction in which it is most convenient or desirable to move the various sheets, relative one to another. It is equally obvious, that the teeth of opposite locators may be disposed to permit locating movement of all of the sheets in the same direction and to lock all of them by movement in the reverse direction. Also the number of teeth on each locator may be increased or diminished without departing from the spirit of the invention.

What I claim is:

1. Form locating means including a form and a locator having respectively inclined teeth adapted to interlock and thereby resist transverse movement of the form away from the locator.

2. In combination, a locator, a form movable transversely and longitudinally of the locator, and inclined teeth on the locator and form respectively adapted to effect camming of the form toward the locator by pressure exerted longitudinally of the form and to interlock to thereby resist transverse movement of the form away from the locator and also prevent longitudinal movement of the form in one direction while permitting free movement of the form in substantially the opposite direction.

3. Sheet collating means including a pair of forms for use in superposed relation with a platen mechanism of the type including, a margin guide and a locator adjacent each side edge of the platen, each form having along one side edge a series of locator engaging teeth for receiving said locators therebetween, said teeth being inclined with respect to said side edges whereby said sheets when moved longitudinally are cammed into engagement with said guides and held against further movement in the same longitudinal direction while freely movable in the opposite direction, and the teeth of one series being oppositely inclined with respect to the teeth of the other series whereby said forms are held against free longitudinal movement in the same direction to prevent movement of one form by free movement of the other.

In testimony whereof I have affixed my signature.

FRANKLIN C. GIBSON.